United States Patent
Ro et al.

(10) Patent No.: US 8,250,289 B2
(45) Date of Patent: Aug. 21, 2012

(54) PHASE-CHANGE RANDOM ACCESS MEMORY AND METHOD OF SETTING BOOT BLOCK THEREIN

(75) Inventors: Yu-hwan Ro, Seoul (KR); Kwang-ho Kim, Hwaseong-si (KR); Kwang-jin Lee, Hwaseong-si (KR); Joon-yong Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 661 days.

(21) Appl. No.: 12/402,006

(22) Filed: Mar. 11, 2009

(65) Prior Publication Data

US 2009/0235036 A1 Sep. 17, 2009

(30) Foreign Application Priority Data

Mar. 13, 2008 (KR) ........................ 10-2008-0023470

(51) Int. Cl.
*G06F 12/00* (2006.01)
*G06F 12/02* (2006.01)

(52) U.S. Cl. ... 711/103; 711/170; 711/171; 365/185.33; 713/2

(58) Field of Classification Search .................. 711/103, 711/161, 170–171, E12.001, E12.002, E12.008; 365/185.33; 713/2
See application file for complete search history.

(56) References Cited

U.S. PATENT DOCUMENTS

| 6,823,435 | B1 | 11/2004 | Wisor |
| 7,102,925 | B2 * | 9/2006 | Kang ........................ 365/185.11 |
| 7,870,378 | B2 * | 1/2011 | Kuo et al. ........................ 713/2 |
| 2007/0086246 | A1 * | 4/2007 | Sakui et al. ............. 365/185.17 |
| 2008/0056023 | A1 * | 3/2008 | Lee et al. ............... 365/189.011 |

FOREIGN PATENT DOCUMENTS

| JP | 2002-133893 | 5/2002 |
| JP | 2007-095241 | 4/2007 |

* cited by examiner

*Primary Examiner* — Jasmine Song
(74) *Attorney, Agent, or Firm* — F. Chau & Associates, LLC

(57) ABSTRACT

A semiconductor memory device includes a memory cell array and the memory cell array includes: a plurality of memory blocks and at least one setting unit. The at least one setting unit stores a location and a size of a boot data storage region within the plurality of memory blocks that stores boot data. The at least one setting units may include a register for setting usage of each memory block as a boot block. The semiconductor device may be a phase-change memory.

19 Claims, 4 Drawing Sheets

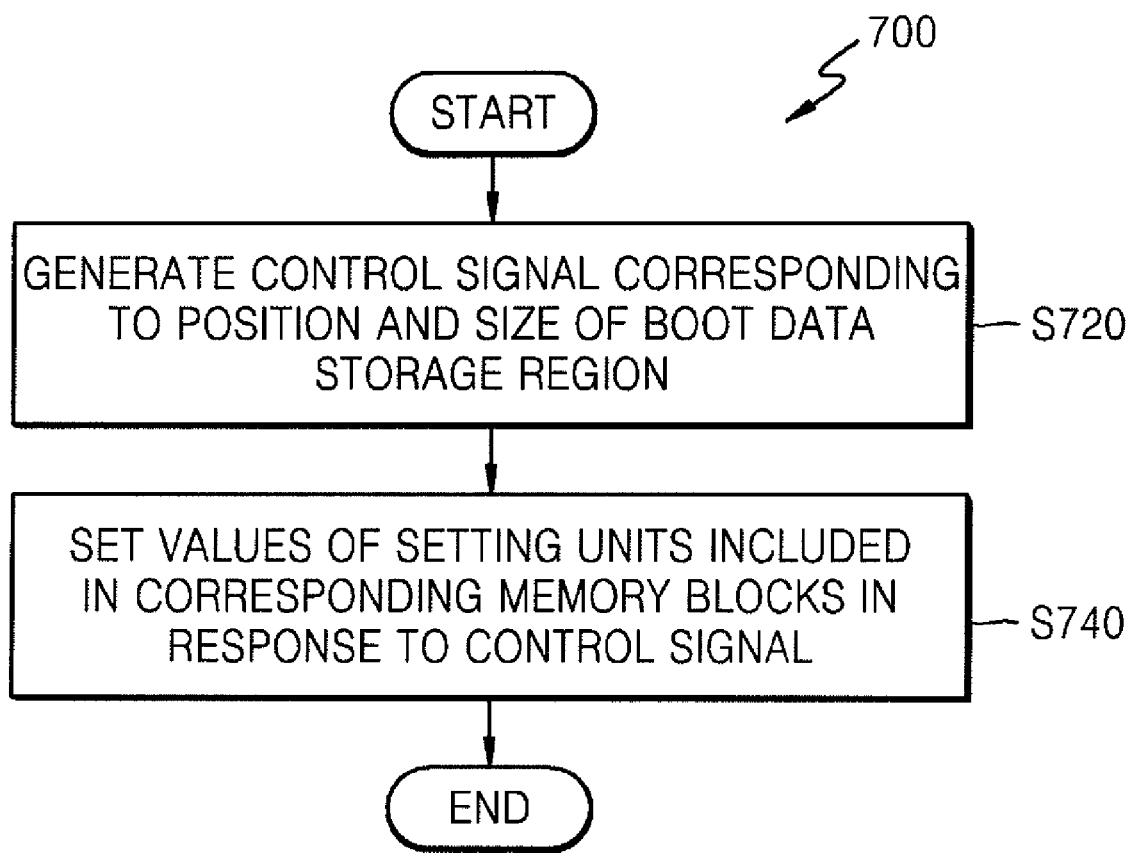

PHASE-CHANGE RANDOM ACCESS MEMORY AND METHOD OF SETTING BOOT BLOCK THEREIN

CROSS-REFERENCE TO RELATED APPLICATIONS

This application claims priority to Korean Patent Application No. 10-2008-0023470, filed on Mar. 13, 2008, in the Korean Intellectual Property Office, the disclosure of which is incorporated by reference in its entirety herein.

BACKGROUND

1. Technical Field

The present disclosure relates to a semiconductor memory device, and more particularly, to a phase-change random access memory and a method of setting a boot block in the memory that can reduce loss of boot data.

2. Discussion of Related Art

Boot sequence information or programs that initialize computer systems when the power is turned on, may be stored in a non-volatile memory device. The boot sequence information or the programs are stored in a part of the non-volatile memory device assigned in advance, which may be referred to as a boot block.

When the non-volatile memory device is a flash memory device, a write operation is performed on a region including a plurality of memory cells. A boot block may be set to include the least number of memory cells to which the write operation can be simultaneously performed.

However, the size of the data to be stored in the boot block may not correspond to the size of the boot block, and thus, a plurality of memory cells may be wasted. The data stored in the boot block is needed for operating a system. However, the data may not persist in the boot block due to a weak durability of the non-volatile memory device.

Thus, there is a need for phase-change random access memories that can efficiently realize a boot block and efficient methods of setting a boot block in a memory device.

SUMMARY

According to an exemplary embodiment of the present invention, a semiconductor memory device comprises a memory cell array and the memory cell array includes: a plurality of memory blocks and at least one setting unit. The setting units store a location and a size of a boot data storage region within the memory blocks. The boot data storage region stores boot data.

All or some of the memory blocks may have the setting unit. All or some of the memory blocks may have a plurality of setting units. Further, some of the memory blocks may not have any setting units. For example, the memory blocks that have setting units may store boot data while the memory blocks that do not have setting units may store normal data.

The size of the boot data storage region may correspond to the number of setting units for the memory block. The setting unit may be a register. The boot data storage region may be set to have a fixed size in response to a first control signal that indicates the size of the boot data storage region. The boot data storage region may be set to a variable size in response to a second control signal that indicates a size of the boot data.

The semiconductor memory device may further include: a boot region controller storing information about the states of the setting units and preventing normal data from being written to the boot data storage region. The boot data storage region may be set to have a fixed size in response to the first control signal, which is transmitted from the boot region controller to indicate the size of the boot data storage region. The boot data storage region may be set to a variable size in response to the second control signal, which is transmitted from the boot region controller to indicate a size of the boot data.

The semiconductor memory device may be a phase-change random access memory (PRAM). The boot data storage region may be set in units of n words, where n is a natural number. The semiconductor memory device may further include: a writing driver for writing normal data or boot data to the memory cell array. The writing driver may generate a cell threshold voltage for writing the normal data and a cell threshold voltage for writing the boot data differently from each other.

According to an exemplary embodiment of the present invention, a method of setting boot data in a boot data storage region disposed in at least one memory block of a semiconductor memory device comprising a memory cell array includes: generating a control signal corresponding to a position and a size of the boot data storage region, and setting values of at least one setting unit of the semiconductor device for indicating the position and the size of the boot data region, in response to the control signal.

BRIEF DESCRIPTION OF THE DRAWINGS

Exemplary embodiments of the present invention will be more clearly understood from the following detailed description taken in conjunction with the accompanying drawings in which:

FIG. 7 is a flowchart illustrating a method of setting a boot block, according to an exemplary embodiment of the present invention.

DETAILED DESCRIPTION OF EXEMPLARY EMBODIMENTS

Figure 1:
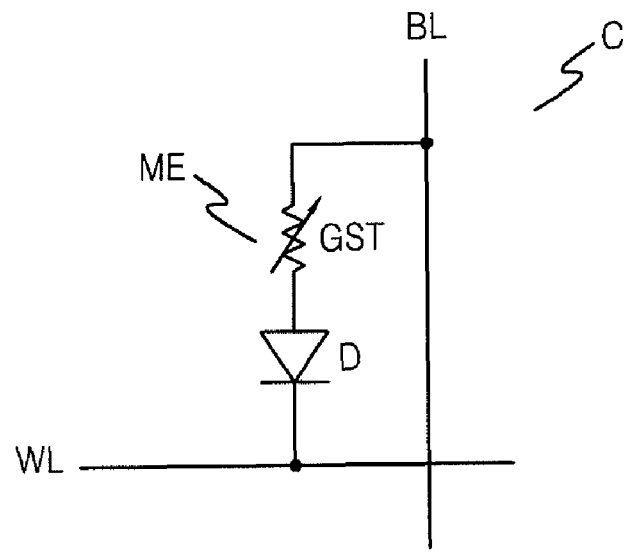
FIG. 1 an equivalent circuit diagram showing a unit cell in a phase-change random access memory.

Hereinafter, the present invention will be described in detail by explaining exemplary embodiments thereof with reference to the attached drawings. Like reference numerals in the drawings denote like elements.

A phase-change random access memory (PRAM) is a non-volatile memory storing data using a material such as Ge—Sb—Te (GST) (hereinafter, referred to as a phase-change material GST). GST is a Germanium-Antimony-Tellurium alloy from the group of chalcogenide glasses. The crystalline and amorphous states of the phase-change material GST have different electrical resistivity. The phase-change material GST changes between the crystalline and amorphous states by application of different temperature changes. A PRAM has non-volatile properties, consumes little power, and can offer higher performance in applications where writing quickly is important.

Figure 2:
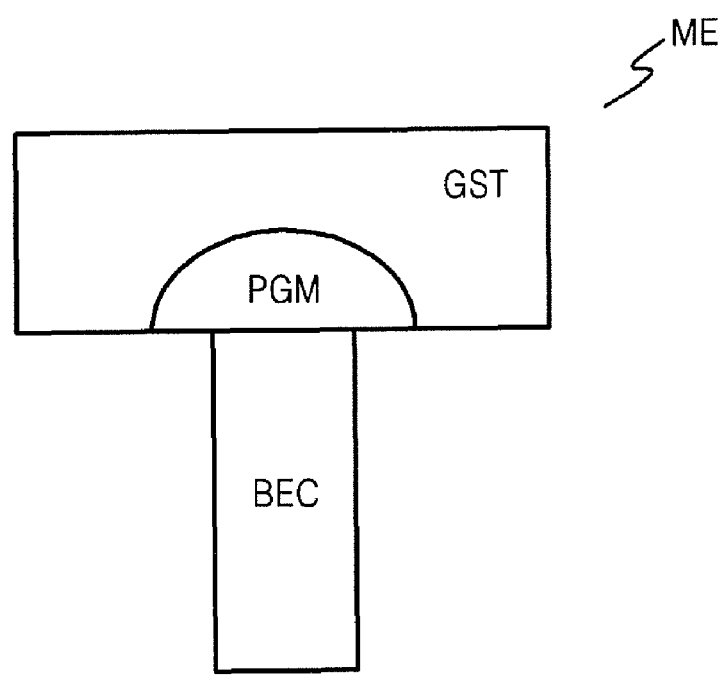
FIG. 2 is a cross-sectional view of a memory device including a phase-change material of FIG. 1.

FIG. 1 is an equivalent circuit diagram showing a unit cell C of the PRAM. FIG. 2 is a cross-sectional view of a memory device ME including the phase-change material GST of FIG. 1.

Referring to FIGS. 1 and 2, the unit cell C of the PRAM includes the memory device ME and a P-N diode D. The phase-change material GST is connected to a bit line BL and a P-junction of the diode D. A word line WL is connected to an N-junction of the diode D.

The memory device ME includes the phase-change material GST. The PRAM stores information based on the crystalline and amorphous states of the phase-change material GST in the unit cell C according to temperature and heating time. The phase-change material GST changes to the crystalline state when it is heated to a temperature of about 400° C. The phase-change material GST changes to the amorphous state when it is heated to a temperature of about 600° C. (900° K) or higher. The phase-change material GST may be heated by adjusting an electric current flowing into the unit cell C.

When the electric current is supplied to a lower electrode BEC of the memory device ME, the volume and state of a part PGM of the phase-change material GST, which contacts the lower electrode BEC, is changed to determine a crystallization status of the phase-change material GST.

Figure 3:
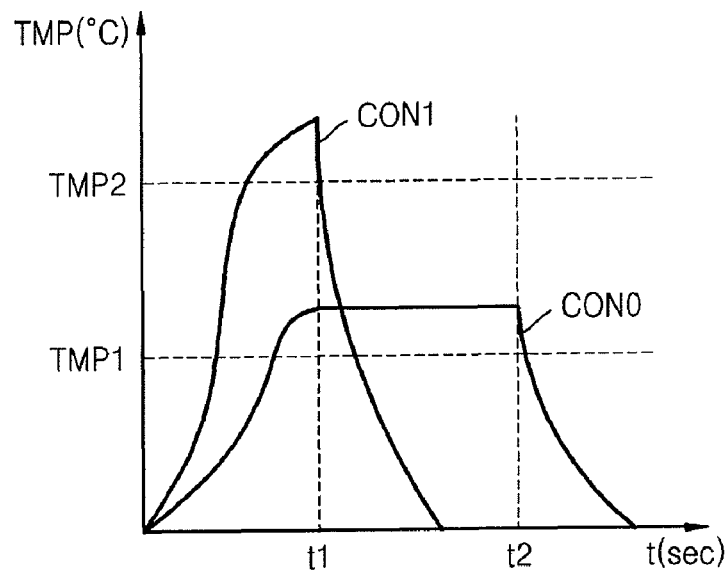
FIG. 3 is a graph showing properties of the phase-change material shown in FIGS. 1 and 2.

FIG. 3 is a graph showing properties of the phase-change material GST shown in FIGS. 1 and 2. Here, reference numeral CON1 of FIG. 3 denotes a condition for changing the phase-change material GST into an amorphous state, and reference numeral CON0 denotes a condition for changing the phase-change material GST into a crystallized state. Referring to FIGS. 1 through 3, write and read operations in the PRAM will be described as follows.

During a write operation for storing information "1", when the phase-change material GST is heated to a melting temperature (TMP2) or higher (t1) and cooled down rapidly, the phase-change material GST changes into the amorphous state. The amorphous state of the phase-change material GST is stored as information "1", and this state may be also referred to as a reset state. During a write operation for storing information "0", the phase-change material GST is heated to a crystallization temperature (TMP1) or higher and cooled down slowly after maintaining the temperature for a predetermined period (t2). At this time, the phase-change material GST is crystallized such that the crystallization state of the phase-change material GST is defined as information "0", and this state may be referred to as a set state.

In a read operation, the memory cell C to be read is selected by selecting the bit line BL and the word line WL corresponding to each other. A read current is supplied to the selected memory cell C to distinguish the information "1" and the information "0" from each other using a voltage change caused by the resistance of the phase-change material GST.

The PRAM may perform the write operation in units of words. Hereinafter, a structure and a method of setting a part of the PRAM, which can perform a write operation in units of words as a boot block for storing boot information, will be described according to exemplary embodiments of the present invention.

Figure 4:
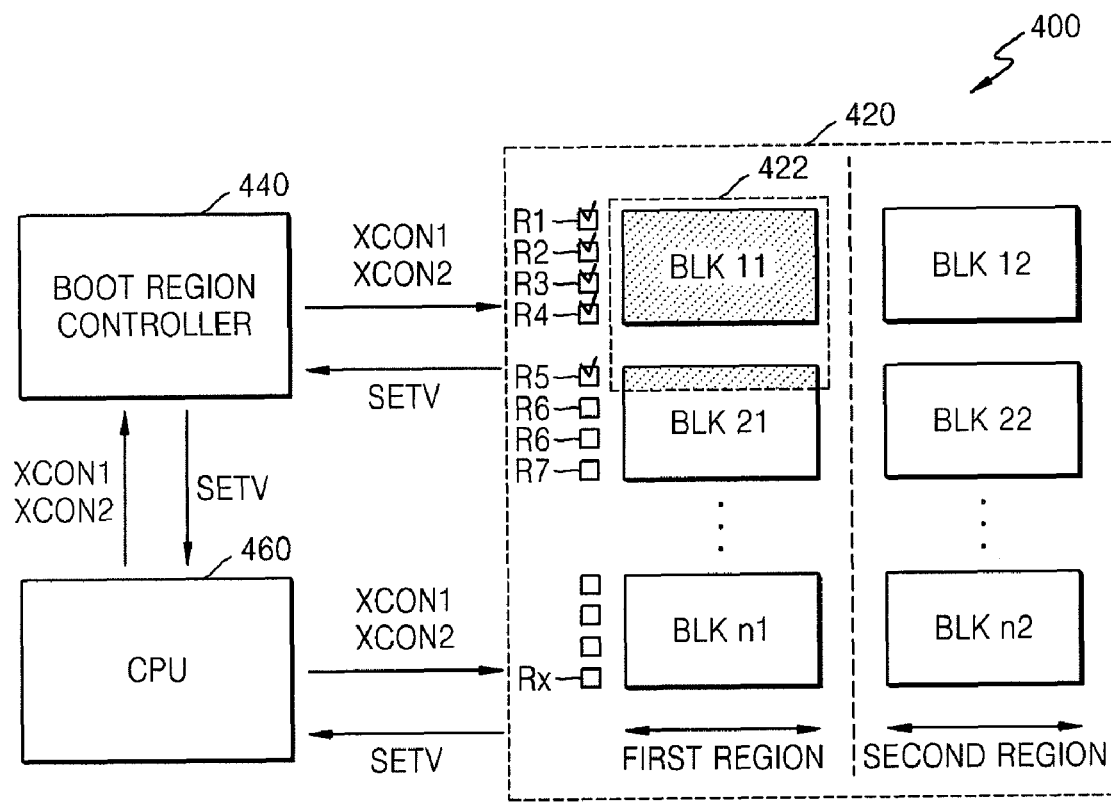
FIG. 4 is a block diagram showing a phase-change random access memory according to an exemplary embodiment of the present invention.

FIG. 4 is a block diagram showing a PRAM 400 according to an exemplary embodiment of the present invention. Referring to FIG. 4, an embodiment of the PRAM 400 may include a memory cell array 420 that includes a plurality of memory blocks BLK11, BLK21, ..., BLKn2.

An embodiment of the PRAM 400 may store boot data (not shown), which is required to boot the PRAM 400, in some or all of the memory blocks BLK11, BLK21, ..., and BLKn2.

FIG. 4 shows the memory cell array 420 in which the boot data is stored in the memory blocks BLK11, BLK21, ..., and BLKn1 that are located in a first region (Boot Block Ready), among the memory blocks BLK11, BLK21, ..., and BLKn2.

In an embodiment of the PRAM 400, the memory blocks BLK11, BLK21, ..., and BLKn1 that may store the boot data include at least one or more setting units R1, R2, ..., Rx. Here, the setting units R1, R2, ..., Rn1 may be registers having set values that indicate the location and/or a size of a boot data storage region in the corresponding memory blocks of the boot data storage region.

FIG. 4 shows that each of the memory blocks BLK11, BLK21, ..., and BLKn1, which may store the boot data, includes four registers. For example, the first memory block BLK11 includes first through fourth registers R1-R4, and the second memory block BLK21 includes fifth through eighth registers R5-R8. However, embodiments of the present invention are not limited to four registers, as each block may include a lesser or greater number registers.

Each of the registers R1, R2, ..., Rx indicates whether or not the boot data is stored in a quarter of the corresponding memory block of the boot data storage region. In the present embodiment of FIG. 4, the first through fourth registers R1-R4 included in the first memory block BLK11 and the fifth register R5 included in the second memory block BLK21 indicate that the boot data is stored in the corresponding parts of the memory blocks (checked). The PRAM 400 of FIG. 4 has a boot data storage region 422, which corresponds to a size of 5/4 of a memory block.

As discussed above, each block may include a lesser or greater number of registers. For example, when each block includes three registers, each register indicates whether the boot data is stored in a third of the corresponding block, when each block includes five registers, each register indicates whether the boot data is stored in a fifth of the corresponding block, etc.

As described above, the PRAM 400 according to at least one exemplary embodiment of the present invention may set the boot data storage region 422 in units of words. Referring to FIG. 4, the PRAM 400 may further include a boot region controller 440 that controls the set value of a register and/or prevents normal data from being written to the boot data storage region 422.

The boot region controller 440 transmits a first control signal XCON1 or a second control signal XCON2 to corresponding registers to control the setting of the boot data storage region 422. The boot region controller 440 may transmit the first control signal XCON1 to the memory cell array 420 when the boot data storage region 422 is to be set with a fixed size.

In the above described example of FIG. 4, where a processor 460 or a user requests that the boot data storage region 422 have a size that is 5/4 of one memory block, the first control signal XCON1 transmits the first through fifth registers R1-R5.

The boot region controller 440 may transmit a second control signal XCON2 to the memory cell array 420 when the boot data storage region 422 is to be set to correspond to the size of the boot data. Here, when the boot data having a first size is stored in some memory blocks in response to the second control signal XCON2, information about the registers corresponding to the regions (boot data storage regions), in which the boot data is stored, is transmitted to the boot region controller 440.

For example, if the boot data having a size that is 5/4 of one memory block is stored in the regions corresponding to the first through fifth registers R1-R5, the boot region controller 440 is notified that the regions corresponding to the first through fifth registers R1-R5 store the boot data (SETV). In addition, if the boot data having a size corresponding to one memory block is stored in regions corresponding to the fifth through eighth registers R5-R8, the boot region controller 440 is notified that the regions corresponding to the fifth through eighth registers R5-R8 store the boot data (SETV).

Since a PRAM 400 according to at least one exemplary embodiment of the present invention may provide information about the size of the boot data storage region 422 that corresponds to the size of boot data stored therein, waste of memory may be prevented.

The boot region controller 440 may store information about the states of the registers (SETV). The boot region controller 440 may include a configuration controller (not shown) for storing the information about the states of the registers. The boot region controller 440 may include a configuration register (not shown) to store the states of the registers. The boor region controller 440 may prevent the boot data storage region 422 from storing normal data using the information about the states of the registers stored in the configuration register.

The boot region controller 440 may receive the first and second control signals XCON1 and XCON2 from the processor 460 or the user (not shown) for transmission to the memory cell array 420. The boot region controller 440 may transmit the information about the states of the registers stored therein to the processor 460 or the user.

The processor 460 or the user may directly receive the information about the states of the registers from the memory cell array 420 or directly transmit the first and second control signals XCON1 and XCON2 to the memory cell array 420 without passing through the boot region controller 440.

Figure 5:
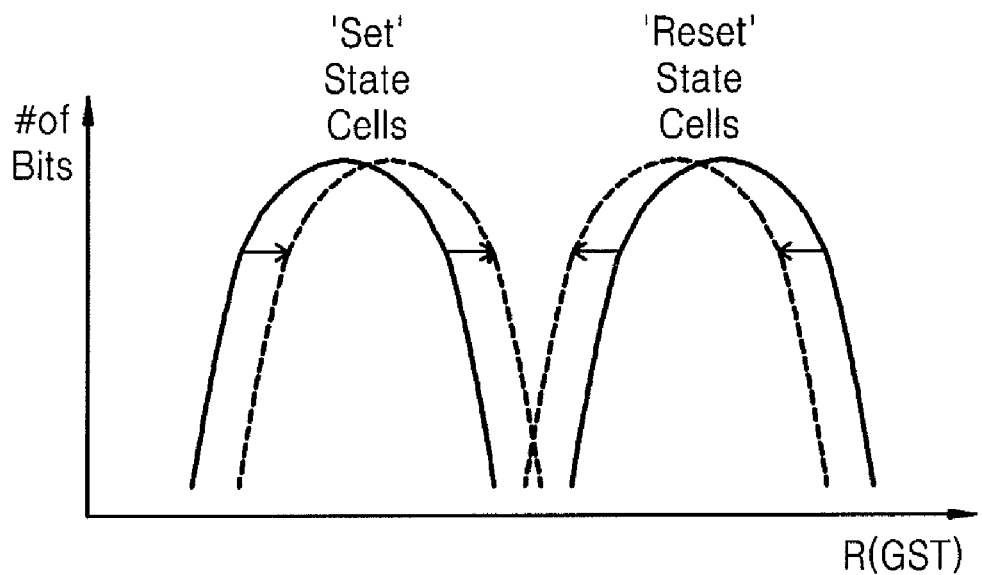
FIG. 5 is a timing view showing a distribution of a threshold voltage for writing normal data to the phase-change random access memory of FIG. 4.
Figure 6:
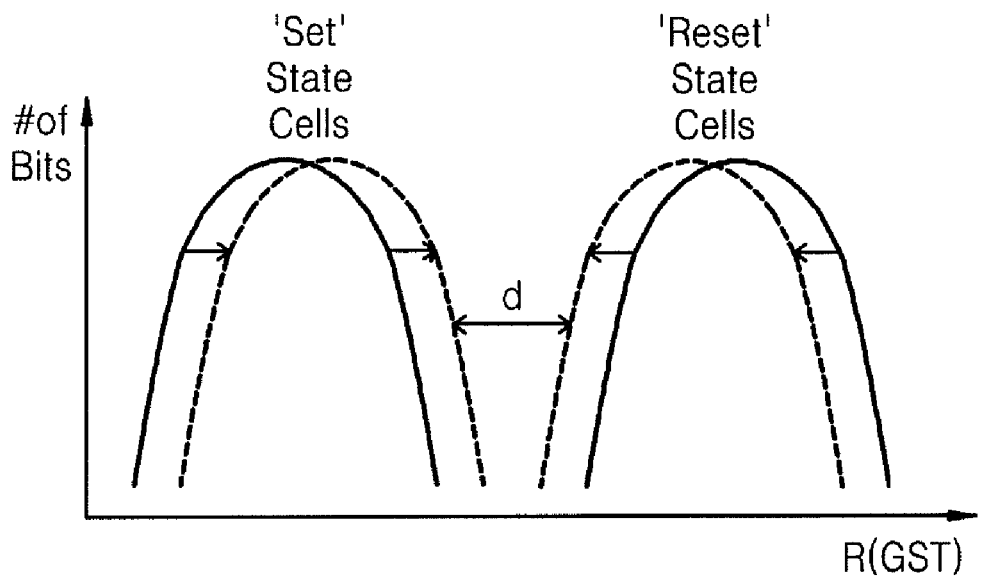
FIG. 6 is a timing view showing a distribution of a threshold voltage for writing boot data to the phase-change random access memory of FIG. 4.

FIG. 5 is a timing view showing a distribution of a threshold voltage for writing normal data to the PRAM 400 of FIG. 4. FIG. 6 is a timing view showing a distribution of a threshold voltage for writing the boot data to the PRAM 400 of FIG. 4.

Referring to FIGS. 4 through 6, the write operation of the boot data to the boot data storage region 422 may occur more frequently than the read operation of the boot data. Accordingly, it is preferred that the memory cells of the boot data storage region 422 have high endurance and/or retentivity.

The difference between the resistance values of the GST (refer to FIG. 1 or FIG. 2) in the memory cell in a reset state and a set state may be increased to improve the endurance or retentivity of the memory cell of the boot data storage region 422. However, the difference between the resistance values according to the states may result in an increase in a writing speed and/or a current consumption.

The PRAM 400 may include a writing driver (not shown) that generates a threshold voltage for writing the normal data and a threshold voltage for writing the boot data differently from each other. For example, the magnitude of the threshold voltage for writing the normal data shown in FIG. 5 and the magnitude of the threshold voltage for writing the boot data shown in FIG. 6 may be different from each other.

In one exemplary embodiment of the PRAM 400, the difference between the resistance values of the memory cell in the set state and the reset state in the boot data storage region 422 (refer to FIG. 6) is greater than the difference between the resistance values of the memory cell in the set state and the reset state in the normal data storage region (remaining memory cell array except for the boot data storage region 422) (refer to FIG. 5). Therefore, even when the states of the memory cells in the boot data storage region 422 are changed due to the frequent read operations, a sensing margin d between the set state and the reset state can be maintained.

As described above, according to at least one embodiment of the PRAM 400, the durability or the storage capacity of the boot data storage region can be improved while minimizing the writing speed and the current consumption.

FIG. 7 is a flowchart illustrating a method 700 of setting a boot block, according to an exemplary embodiment of the present invention. Referring to FIG. 7, a control signal corresponding to a position and a size of a boot data storage region is generated (S720), and setting units included in memory blocks, which correspond to the control signal, among a plurality of memory blocks included in a memory cell array, are set in response to the control signal (S740). The method 700 of setting the boot block may be applied to the PRAM 400 of FIG. 4.

According to at least one embodiment of a PRAM and a method of setting the boot block in the PRAM, each memory block of the PRAM includes a register for setting the usage of the memory block as a boot block so that a part of the PRAM can be used as the boot block. Thus, the boot block can be set in units of word units, and waste of memory capacity can be reduced.

Moreover, according to at least one other embodiment of a PRAM and a method of setting the boot block in the PRAM, cell threshold voltages for writing boot data to a boot data storage region of the PRAM and the cell threshold voltages for writing normal data are set differently from each other. Thus, the durability of the boot data storage region can be improved, the data storage period of the boot data storage region can be increased, and loss of boot data can be minimized.

While the present invention has been particularly shown and described with reference to exemplary embodiments thereof, it will be understood that various changes in form and details may be made therein without departing from the spirit and scope of the disclosure.

What is claimed is:

1. A semiconductor memory device comprising:
   a phase-change random access memory (PRAM) comprising a memory cell array, wherein the memory cell array comprises:
      a plurality of memory blocks each comprising a material that changes between a crystalline state and an amorphous state by application of different temperature changes; and
      at least one setting unit for storing a location and a size of a boot data storage region within the plurality of memory blocks that stores boot data,
   wherein at least two of the setting units correspond to one of the memory blocks, each setting unit corresponding to a same fraction of the one memory block, and a size of the boot data storage region corresponds to the number of setting units set to represent the boot data storage region times the fraction.

2. The semiconductor memory device of claim 1, wherein some of the memory blocks do not have a corresponding setting unit.

3. The semiconductor memory device of claim 1, wherein some of the memory blocks have a plurality of the setting units.

4. The semiconductor memory device of claim 1, wherein the at least one setting unit is a register.

5. The semiconductor memory device of claim 1, wherein the boot data storage region is set to have a fixed size in response to a first control signal that indicates the size of the boot data storage region.

6. The semiconductor memory device of claim 1, wherein the boot data storage region is set to a variable size in response to a second control signal that indicates a size of the boot data.

7. The semiconductor memory device of claim 1, further comprising:
   a boot region controller storing information about states of the setting units and preventing normal data from being written to the boot data storage region.

8. The semiconductor memory device of claim 7, wherein the boot data storage region is set to have a fixed size in response to a first control signal which is transmitted from the boot region controller to indicate the size of the boot data storage region.

9. The semiconductor memory device of claim 7, wherein the boot data storage region is set to a variable size in response to a second control signal which is transmitted from the boot region controller to indicate a size of the boot data.

10. The semiconductor memory device of claim 1, further comprising:
    a writing driver generates a first cell threshold voltage for writing the normal data to the memory cell array and a second cell threshold voltage for writing the boot data to the memory cell array, wherein the first and second cell threshold voltages are different from each other.

11. A method of setting boot data in a boot data storage region disposed in at least one memory block of a semiconductor memory device comprising a memory cell array, the method comprising:
    generating a control signal corresponding to a position and a size of the boot data storage region; and
    setting values of at least two setting units of the semiconductor memory device for indicating the position and the size of the boot data region, in response to the control signal,
    wherein the two units correspond to one of the memory blocks, each setting unit corresponding to a fraction of the one memory block, and the size corresponds to the number of setting units set times the fraction.

12. The method of claim 11, wherein each setting unit is a register storing setting values that indicate the position of the boot data storage region in the at least one memory block of the boot data storage region.

13. The method of claim 11, wherein some of the memory blocks do not have a corresponding setting unit.

14. The method of claim 11, wherein the control signal is generated corresponding to a fixed size of the boot data storage region.

15. The method of claim 11, wherein the control signal is generated corresponding to the boot data storage region having a size that varies from the boot data.

16. The method of claim 11, further comprising:
    storing information about a state of the setting unit or a setting value stored in the setting unit in a boot region controller of the semiconductor memory device.

17. The method of claim 16, further comprising:
    transmitting the setting value to the setting unit or transmitting the setting value to a user or a processor according to the control signal stored in the boot region controller.

18. The method of claim 11, wherein the semiconductor memory device is a phase-change random access memory (PRAM).

19. A semiconductor memory device comprising:
    a phase-change memory cell array comprising a material that changes between a crystalline state and an amorphous state by application of different temperature changes; and
    a boot region controller,
    wherein the array comprises:
        a first region comprising a plurality of registers and a plurality of first memory blocks, wherein at least two of the registers correspond to one of the first memory blocks, each register corresponding to a same fraction of the one memory block, the first region configured for storing boot data; and
        a second region comprising a second plurality of memory blocks, the second region for storing normal data distinct from the boot data,
    wherein the boot region controller applies a control signal to a number of the at least two registers to represent a boot data storage region storing the boot data.

* * * * *